United States Patent [19]

Allen et al.

[11] 4,119,609

[45] Oct. 10, 1978

[54] CURABLE EPOXY-CARBOXYLIC ACID ADDUCTS

[75] Inventors: Roy A. Allen; LeRoy W. Scott, both of Houston, Tex.

[73] Assignee: Shell Oil Company, Houston, Tex.

[21] Appl. No.: 782,207

[22] Filed: Mar. 28, 1977

[51] Int. Cl.² ............................................. C08G 59/52
[52] U.S. Cl. ...................................... 528/99; 562/453; 528/114; 528/98; 528/330; 528/331; 528/404; 528/328; 528/107; 528/269
[58] Field of Search ............ 260/47 EA, 78 A, 2 EA, 260/518 R, 519

[56] References Cited

U.S. PATENT DOCUMENTS

| 2,988,535 | 6/1961 | Feuchtbaum et al. ................. 260/47 |
|---|---|---|
| 3,215,586 | 11/1965 | Lister et al. ........................... 161/203 |
| 3,419,525 | 12/1968 | Aelony .................................... 260/47 |
| 3,945,952 | 3/1976 | Fujimoto et al. ..................... 260/2 N |
| 3,963,796 | 6/1976 | Yokono et al. ............... 260/830 TW |

OTHER PUBLICATIONS

Lee et al., *Handbook of Epoxy Resins,* McGraw-Hill, 1967, pp. 11–18.

*Primary Examiner*—Harold D. Anderson
*Assistant Examiner*—E. A. Nielsen
*Attorney, Agent, or Firm*—Norris E. Faringer

[57] ABSTRACT

Adducts of epoxy compounds with amino-substituted aromatic carboxylic acids are described. These carboxyl-containing adducts may be cured with conventional epoxy curing agents or solubilized to prepare aqueous coating systems.

7 Claims, No Drawings

CURABLE EPOXY-CARBOXYLIC ACID ADDUCTS

BACKGROUND OF THE INVENTION

Adducts of epoxy compounds such as glycidyl polyethers of bisphenol A with amines, polycarboxylic acids, polyamines, polyamides, etc. are known.

In general, such adduts are very specific compositions which are "tailored" to meet a specialized objective. Therefore, it would be highly desirable to prepare epoxy adducts which can be utilized in a multitude of divergent applications and end uses.

It has now been discovered that certain adducts prepared by condensing epoxy compounds with amino-containing aromatic carboxylic acids can be cured with conventional epoxy curing agents to produce good surface coatings. These adducts or precondensates can also be solubilized for use in hydrolytically-stable, water-soluble curable coating compositions. These water-soluble curable coating compositions prepared from the present precondensates are described and claimed in copending patent application Ser. No. 782,206, filed Mar. 28, 1977.

SUMMARY OF THE INVENTION

The present invention provides carboxyl-containing adducts prepared by condensing an epoxy compound with an amino-substituted aromatic carboxylic acid. These adducts can either be cured with conventional epoxy curing agents or can be solubilized to produce aqueous baking systems which are exceptionally stable, i.e. hydrolytically stable. It will be appreciated that the elimination or reduction of organic solvents from coating compositions is a distinct advantage.

DESCRIPTION OF THE PREFERRED EMBODIMENT

As noted hereinbefore, the present invention is directed to the preparation of adducts of epoxy resins with an amino-substituted aromatic carboxylic acid.

Epoxy Compounds

The epoxy compounds which may be used to prepare the instant adducts contain at least 1,2-epoxide group, i.e., a

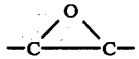

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, chlorophenyl glycidyl ether, naphthyl glycidyl ether, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl oleate, methyl 1,2-epoxy propionate, butyl 1,2-epoxy propionate, and the like.

The polyepoxides used in the process of the invention comprise those compounds possessing more than 1,2-epoxide group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 3,633,458. The polyepoxides used in the present process are those having an epoxy equivalency greater than 1.0.

Various examples of polyepoxides that may be used in the invention are given in U.S. Pat. No. 2,633,458 and it is to be understood that so much of the disclosure of that patent relative to examples of polyepoxides is incorporated by reference into this specification.

Other suitable mono polyepoxides, including ethers and esters are disclosed in U.S. Pat. No. 3,738,862, and so much of the disclosure of that patent relevant to examples of epoxy compounds is incorporated by reference into this specification.

Other suitable polyepoxides are disclosed in U.S. Pat. Nos. 3,356,624; 3,408,219; 3,446,762 and 3,446,762, and so much of the disclosure relevant to examples of epoxy compounds is incorporated by reference into this specification.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is throughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as BF$_3$, followed by dehydrohalogenation in the presence of caustic. When the phenol is Bisphenol A, the resulting saturated epoxy is sometimes referred to as "diepoxidized hydrogenated bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic ring structure of the phenols have been or are saturated.

An idealized structure formula representing the preferred saturated epoxy compounds is as follows:

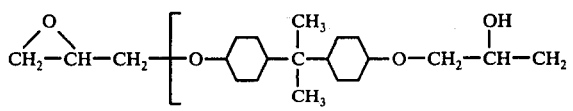 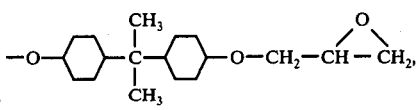

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

The most preferred epoxy resin for use in the present adducts is a glycidyl polyether of 2,2-bis(4-hydroxyphenyl)propane having a molecular weight between about 350 and 3000. A very suitable liquid glycidyl polyether is designated as polyether A in U.S. Pat. No. 2,633,458. Very suitable epoxy resins include the glycidyl polyethers of BPA marketed under the trade designations of EPON ® Resin 1001, 1004, 1007, etc. Other suitable solid epoxy resins include the condensates or fusion resins prepared as described in U.S. Pat. No. 3,477,990.

Under certain conditions, a portion of the epoxy resin can be a glycidylized novolak resin. Of course, mixtures of epoxy resins may be used.

Amino-Substituted Aromatic Carboxylic Acid

Suitable amino-substituted aromatic carboxylic acids include the acids having the following structure:

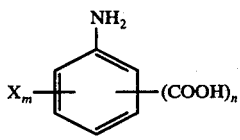

wherein X is selected from the group consisting of hydroxyl, alkyl, and halogen radicals, $n$ has the value of 1 or 2 and $m$ has the value of 0 or 1.

Preferred amino-substituted acids include the amino-substituted benzoic acids such as the ortho-, meta- and para-aminobenzoic acid.

The most preferred aromatic acid is para-aminobenzoic acid (PABA). The use of "para-aminobenzoic acid" or "PABA" in the present disclosure is illustrative only and is deemed to include other amino-substituted aromatic carboxylic acids where circumstances warrant.

The amino-substituted aromatic carboxylic acid, PABA, for example, is condensed or reacted with the epoxy compound under conditions which cause the amine group to react with the epoxy and hydroxyl groups of the polyether, while leaving the carboxyl groups essentially unreacted. In general, a low temperature is employed, such as about between 150° F. and 250° F. In general, the reactants are combined in near stoichiometric amounts; however, an excess of either reactant, say up to a 10% excess, may be employed with a slight excess of amine hydrogen over epoxide groups being preferred. Expressed another way, the amounts of epoxy resin and aromatic acid employed will usually be in amounts to produce a condensate having a theoretical acid number between about 30 and 90, preferably between 40 and 60, and a weight per epoxy (WPE) of from about 2400 to about 40,000, and preferably from about 10,000 to about 40,000. These high WPE values are due to the slight excess of amine hydrogen.

The condensation reaction may be conveniently conducted in the presence of a suitable solvent, preferably an organic solvent or mixture thereof.

Suitable organic solvents include the ether alcohols, such as the methyl, ethyl or butyl ethers of ethylene glycol or propylene glycol as well as methyl OXITOL ® glycol ether and methyl CELLOSOLVE esters such as CELLOSOLVE ® acetate (ethylene glycol monoacetate) and methyl CELLOSOLVE ® acetate (acetate of ethylene glycol monoethyl ether) propylene glycol ethers like PROPASOL B, and water-miscible ketones such as methyl ethyl ketone (MEK), methyl isobutyl ketone (MIBK) and cyclohexanone.

The resulting adducts or precondensates comprise the invention of the instant specification and said adducts may either cured with conventional epoxy curing agents, especially the amine-containing curing agents to form very good coatings or they may be solubilized by the process described and claimed in copending patent application Ser. No. 782,206, filed Mar. 28, 1977.

Briefly, the instant carboxyl-containing adducts may be reacted with an amine, preferably a tertiary amine, or ammonia, wherein the carboxyl groups are "neutralized" and the adduct solubilized. This neutralization step is generally performed at temperatures between about 150° and 210° F., and preferably between about 180° and 190° F.

The resulting neutralized product may then be conveniently converted to an aqueous baking system by adding sufficient water to produce a system of 20 to 30% non-volatiles (NV) and then adding a water-soluble or water-miscible curing agent such as the aminoplast resins and phenolic resin. A preferred method of preparing aqueous baking systems is to add the aminoplast or phenolic resins to the carboxyl-containing adduct solution before adding water. This makes it possible to employ crosslinking resins that are less water-soluble.

Suitable water-soluble crosslinking agents include the so-called amino resins or amino-plasts containing —NH$_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is also well-known. Accordingly, a large number of amino-plast and phenol-plast resins, i.e., urea-formaldehyde and melamine-formaldehyde resins, are commercially available under such trade designations as Plaskon, Beetle, Cymel, Fiberite, Resimene, Curacron and Beckamine, among many others.

A very suitable water-soluble crosslinking agent include the hexamethoxy methylmelamines marketed under the trade designation of CYMEL ®.

The aqueous system may be applied to a suitable substrate by any suitable means such as by brush, blade or spraying. The resulting coating is then cured by heating for 2 to 10 minutes at 350° F. to 400° F.

As noted hereinbefore, the present carboxyl-containing adducts may be cured with conventional epoxy curing agents, particularly amino-containing compounds. The literature, including a multitude of patents, adequately and completely lists well-known epoxy curing agents; therefore, no attempt will be made herein to list all suitable such curing agents.

A very suitable list of curing agents is found in U.S. Pat. No. 3,477,990, among many other patents which are well-known to those skilled in the epoxy resins and their applications and end uses.

Curing agents that can be utilized include, among others, amines, amino-containing polymers, polybasic acids, acid anhydrides, salts, mercaptans, hydrazines, $BF_3$ gas, $BF_3$-complexes, and the like, and mixtures thereof. Specific examples of such materials include, among others, p-phenylene diamine, diamino-phenylsulfone, p,p'-methylene dianiline, p,p'-diamino-phenylmethane, triaminobenzene, 2,4-diaminotoluene, tetraaminobenzene, 3,3'-diamino diphenyl, 1,3-diamino-4-isopropylbenzene, 1,3-diamino-4,5-diethylbenzene, diaminostilbene, triethylamine, ethylene diamine, diethylamine, diethylene triamine, triethylene tetramine, tetraethylene pentamine, pyridine, diaminopyridine, piperidine, N,N'-diethyl-1,3-propane diamine, dicyandiamide, melamine, the adducts of diethylene triamine and ethylene oxide, the adduct of diethylene triamine and styrene oxide, the adducts of polyamines and unsaturated nitriles, such as the adducts of polyamines and unsaturated nitriles, such as the adduct of diethylene triamine and acrylonitrile, the adduct of diethylene triamine and unsaturated sulfolanes, and the adduct of p-phenylene diamine and acrylonitrile.

Other examples include the amino-containing polyamides as described in U.S. Pat. No. 2,450,940 and the monomeric amides described in U.S. Pat. No. 2,832,799.

In order to illustrate the invention more fully, a number of specific embodiments are given. The reactants, their proportions, and other specific ingredients are presented as being typical and various modifications can be made in view of the foregoing disclosure and discussion without departing from the spirit or scope of the specification or of the claims. Unless otherwise stated, parts and percentages are by weight.

EXAMPLE I

This example illustrates the preparation of the instant carboxyl-containing adducts and their use in preparing stable, water-soluble coating compositions.

Preparation of Adduct

Into a four-necked, 2-liter flask equipped with stirrer, nitrogen blanket, thermometer, condenser and heating mantle was charged 652.8 parts by weight of a solid epoxy resin (a glycidyl polyether of 2,2-bis(4-hydroxyphenyl)propane, with molecular weight of about 1000), together with 166.7 parts by weight of the monoethyl ether of ethylene glycol and 83.3 parts of ethyl alcohol. The temperature is raised to 80° C. until resin is dissolved. Para-aminobenzoic acid, 97.2 parts by weight are then added. The temperature is maintained at 80° C. for 12 to 15 hours to complete the preparation. The adduct has an acid value of 50.5 and a viscosity of 7.5 poise when reduced to 50% NV with additional monoethyl ether of ethylene glycol. The weight per epoxide of the adduct is about 2000.

Preparation of Coating From Adduct

A clear baking finish, suitable for beverage can linings was prepared from the formulation shown below:

| | |
|---|---|
| Adduct | 150 |
| Ethyl alcohol | 18 |
| Hexamethoxymethylmelamine (CYMELO 301) (HMM) | 28 |
| 2-dimethylamino-2-methyl-1-propanol (85% of theoretical amount required to neutralize) | 13 |
| Demineralized water | 260 |

Procedure

1. Adduct (precondensate), ethyl alcohol, and hexamethoxymethylmelamine were heated to 150° F. and throughly mixed.
2. The 2-dimethylamino-2-methyl-1-propanol (DMAMP 80) was stirred in throughly.
3. Demineralized water is then incorporated in 30-gram increments with through agitation.

| Solution Properties: | |
|---|---|
| % Solids | 30.2 |
| Viscosity (Gardner-Holdt) | "F" |
| Ratio of HMM to precondensate resin (adduct) | 20/80 |

Film Properties

The film properties of the p-aminobenzoic acid precondensate are shown below, compared to a typical water-borne epoxy ester control system. Films, 0.20 to 0.25 mil dry thickness were applied via wire wound draw down bar to electrolytic tin plate and baked 10 minutes at 400° F. (204° C.).

| Precondensate Resin Coating | | Control System* |
|---|---|---|
| Methyl Ethyl Ketone double rubs | >100 | 40–50 |
| Flex, mm (wedge-blend) Steam Processing | 39 | 43 |
| 90 mm at 250° F Blush Resistance | Excellent | Excellent |
| Tape Adhesion | Pass | Pass |

*Water-soluble epoxy resin ester type, crosslinked with hexamethoxy methylmelamine.

| Package Stability: | | |
|---|---|---|
| | p-Aminobenzoic Precondensate | Control System |
| Storage days at 120° F (48.9° C) | System Gardner-Holdt Viscosity | Gardner-Holdt Viscosity |
| Initial | E-F | B |
| 3 | D-E | A-1* |
| 11 | D-E | B |
| 14 | D-E | B |
| 17 | D-E | K** |
| 21 | E | GEL |

*Slightly cloudy
**Increased cloudiness

EXAMPLE II

This example illustrates the preparation of the instant adducts and to cured coatings prepared therefrom.

Preparation of Carboxyl-Containing Adduct

An epoxy-terminated p-aminobenzoic acid precondensate or adduct is prepared by charging 368 grams of EPON® Resin 826, a glycidyl polyether of Bisphenol A having a WPE (weight per epoxy) of 184, and 109 grams of OXITOL® Glycol Ether (monethyl ether of ethylene glycol) into a 4-necked, one-liter flask with nitrogen blanket. The two materials are stirred to effect solution. Para-aminobenzoic acid, 68.5 grams, is added and the temperature raised to 230° F. and held, with stirring, for five hours. The precondensate resin (adduct) has an acid value of 60–65 and a WPE of 430–440. This adduct is then cut to 40% nonvolatiles (NV) with an additional 546 grams of OXITOL® Glycol ether. The 40% NV solution has a Gardner-Holdt viscosity of "V" and is suitable for use as a solvent-borne coating system when used with a suitable curing agent.

Preparation of Cured Coating

To 125 grams of the above-prepared 40% NV solution containing the instant adduct is added 4.7 grams of diethylene triamine (DETA), a conventional amino-containing curing agent.

Films of the above system, 0.001 inch dry thickness were drawn down on phosphate treated steel. After curing seven days at 77° F. and 50% relative humidity the film exhibited methyl isobutyl ketone (MIBK) resistance of greater than 30 minutes, and a pencil hardness of H. In flexibility, the system passed a 1½ inch mandrel bend.

What is claimed is:

1. A curable, carboxyl-containing precondensate prepared by reacting at a temperature from about 150° F. to about 250° F. (1) an epoxy compound containing more than one vicinal epoxy group with (2) an amino-substituted aromatic carboxylic acid, said precondensate having a theoretical acid number of from about 30 to 90 and a weight per epoxy of from about 2400 to about 40,000.

2. The precondensate of claim 1 wherein the epoxy compound is a glycidyl polyether of 2,2-bis(4-hydroxyphenyl) propane having a molecular weight between about 350 and 3000.

3. The precondensate of claim 1 wherein the aromatic carboxylic acid has the following formula:

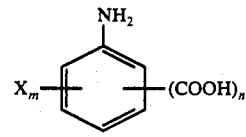

wherein X is selected from the group consisting of hydroxyl, alkyl and halogen radicals, $n$ has a value of 1 or 2 and $m$ has the value of 0 or 1.

4. The precondensate of claim 3 wherein $m$ is zero and $n$ is 1.

5. The precondensate of claim 4 wherein the acid is para-aminobenzoic acid.

6. The precondensate of claim 1 wherein the precondensate has a theoretical acid number of from about 40 to 60 and a weight per epoxy of from about 10,000 to about 40,000.

7. The curable composition comprising the precondensate of claim 1 and a curing amount of an epoxy curing agent.

* * * * *

Notice of Adverse Decision in Interference

In Interference No. 100,313, involving Patent No. 4,119,609, R. A. Allen and L. W. Scott, CURABLE EPOXY-CARBOXYLIC ACID ADDUCTS, final judgment adverse to the patentees was rendered Jan. 23, 1981, as to claims 3, 4 and 5.

[*Official Gazette April 14, 1981.*]